March 31, 1959  R. J. LEVINE  2,879,782
LIQUID PROPORTIONATING SYSTEM
Filed April 3, 1953  2 Sheets-Sheet 1
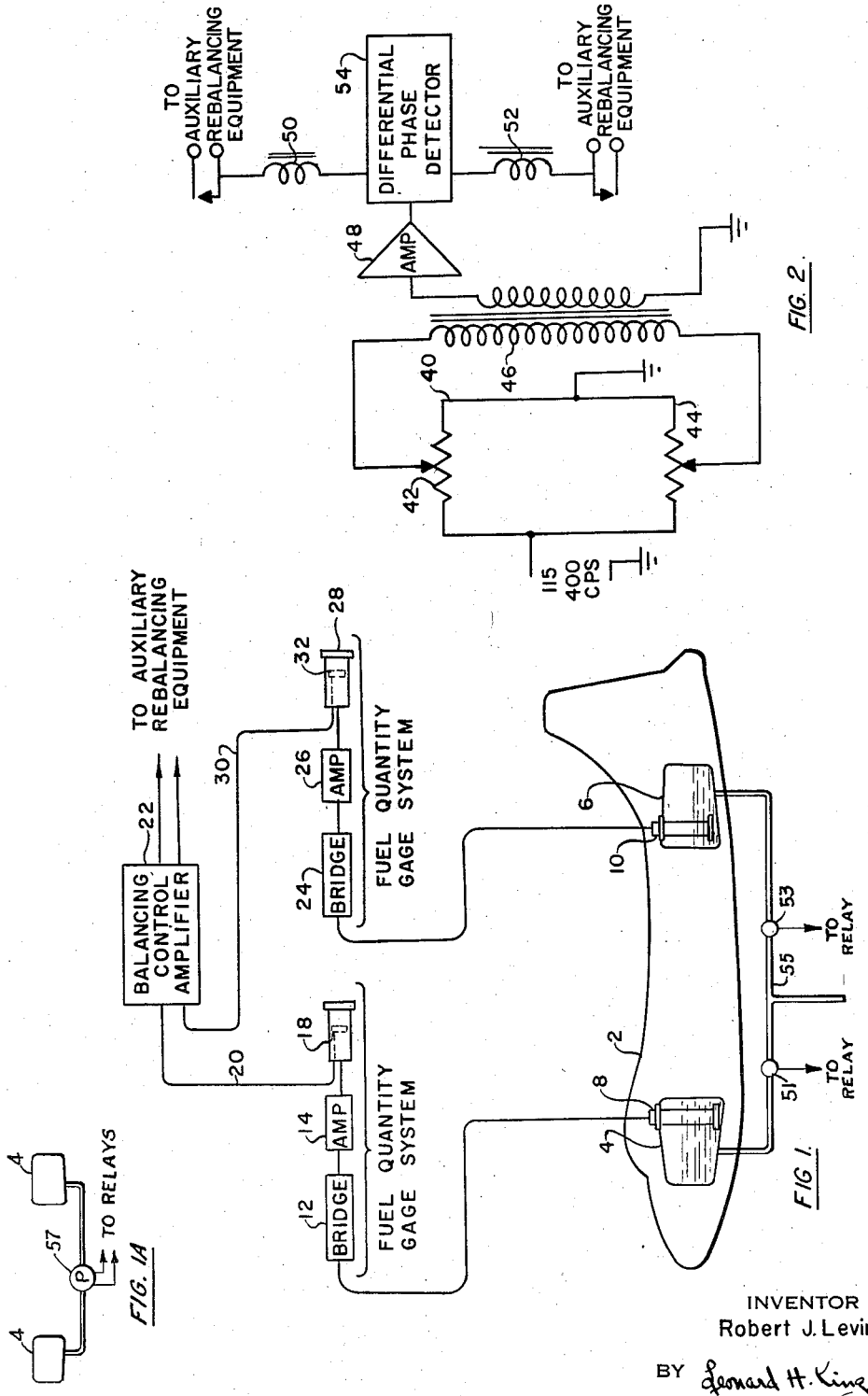
INVENTOR
Robert J. Levine
BY Leonard H. King
AGENT

United States Patent Office 2,879,782
Patented Mar. 31, 1959

2,879,782

LIQUID PROPORTIONATING SYSTEM

Robert J. Levine, New York, N.Y.

Application April 3, 1953, Serial No. 346,736

2 Claims. (Cl. 137—98)

This invention relates to control systems and in particular to proportionating systems suitable for proportionating the flow of liquid from various tanks of an aircraft fuel system.

In an aircraft, several tanks are used to contain the fuel supply. These tanks are distributed in various portions of the aircraft in order to maintain control of the aircraft's center-of-gravity. For example, tanks are located in the wings and fore and aft portions of the fuselage.

This invention provides a balancing control system whose function is to maintain a pre-determined relationship between the weight or levels of fuel in each of two tanks. In so doing, the system may control the withdrawal of fuel from the tanks so as to maintain the center-of-gravity of the aircraft constant. Basically, the system compares the quantities of fuel in each of two tanks such as in each of the wing tanks, and produces no output signal when the two quantities are in balance. In the event that one tank begins to empty faster than a pre-determined rate, an output signal is produced. This signal, after being amplified is used to control a relay. In turn, the relay controls correcting devices such as pumps or valves until balance is restored.

It is an object of this invention to provide a balancing control system for an aircraft fuel system.

It is an object of this invention to provide an improved proportionating control system.

It is another object of this invention to provide a method and apparatus for maintaining the center-of-gravity of an aircraft constant.

It is another object of this invention to provide a control means for fuel distribution system of an aircraft which is light in weight.

Figure 1 shows partly schematically and partly pictorially the system of this invention.

Figure 1A discloses pictorially means for transferring liquid between tanks, controlled by this invention.

Figure 2 shows schematically a simplified circuit of this invention.

Figure 3:
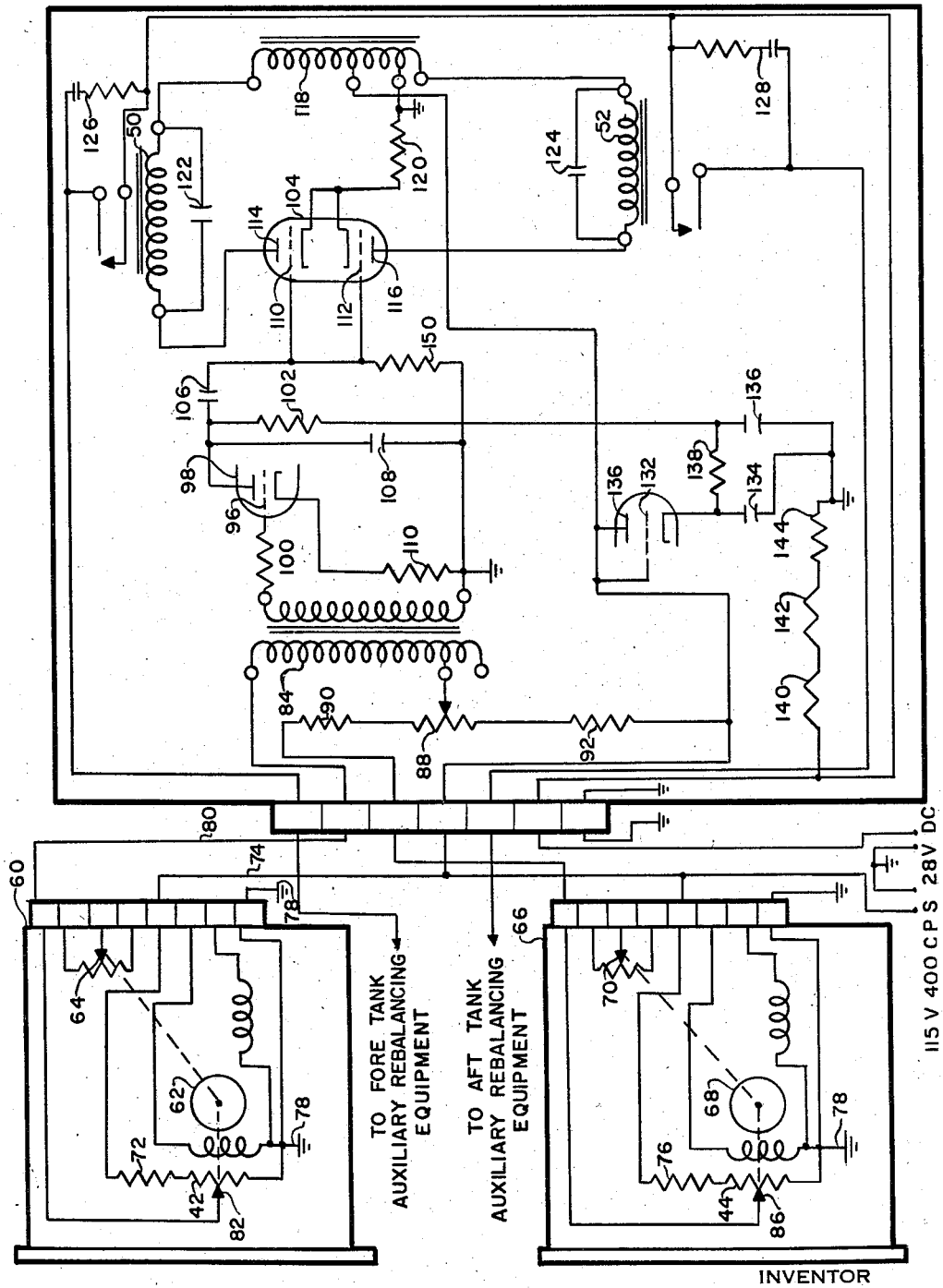
Figure 3 shows schematically a preferred circuit of this invention.

In Figure 1 there is shown in block form a typical capacitive type fuel quantity gaging system. Aircraft 2 contains fore tank 4 and aft tank 6. Tank unit 8 and tank unit 10 each contain a sensing capacitor consisting of two concentric tubes inserted in the fuel contained in the tanks. The displacement of the liquid from between the tubes by air results in a change of capacitance which unbalances a bridge circuit shown by block 12. The output of this bridge is fed through an amplifier 14, amplified and is then used to drive a motor located in the indicator housing 60 which operates a movable wiper of a potentiometer forming part of bridge circuit 12 so as to rebalance the bridge at which time the signal applied to amplifier 14 is effectively zero so that no further operation of the motor takes place. On the shaft of the motor driving the potentiometer wiper of the rebalancing arm of bridge 12, there is located an indicator (not shown) and an additional potentiometer wiper 18. An output derived from this potentiometer may be fed by means of cable 20 to a balancing control amplifier 22. In a similar fashion, the output of the capacitor located in tank unit 10 may be fed through self-balancing bridge 24, amplifier 26, and indicator 28 so as to cause the potentiometer 32 operated from the same shaft as the indicator 28 to supply a voltage proportional to the level of the liquid in tank 6 to the balancing control amplifier 22 via cable 30; the output of the balancing control amplifier being fed through auxiliary rebalancing equipment. With reference to Figure 2, bridge 40 is energized from a 115 volt 400 c.p.s. source. As explained previously, the voltage at the wiper arm of the indicator proportional potentiometers 42 and 44 is proportional to the fuel level within their respective tanks. The proportional potentiometer circuits are such that when the fuel levels are in the desired proportion, the voltages will be equal and will cancel. Cancellation of voltages results in zero current in the transformer primary 46 and zero signal input to the amplifier 48. In this unbalanced state, one of the normally open relays 50 and 52 is unenergized. It being understood that in some systems, the relays may be of the normally closed type. If the fuel level drops too rapidly in the aft tank 6, with respect to the fore tank 4, as is measured by the indicator in which proportional potentiometer 44 is situated, the bridge circuit becomes unbalanced and voltage from fore tank potentiometer 42 is impressed across transformer primary 46. This phase reversal takes place across the transformer windings and again across the input to the amplifier 48. The phase of the voltage thus applied to the differential phase detector 54, is such that relay 50 is energized. Its contacts then close to energize its related auxiliary equipment which regulates fuel consumption from the tanks so as to rebalance the fuel weight. When the fore tank empties too rapidly, the phase relationship is reversed and relay 52 is energized. Rebalancing the fuel weight, in either case, also rebalances the bridge circuit by means of the proportional potentiometers.

The auxiliary control equipment may comprise a pair of valves 51 and 53 which are inserted in line 55 so as to control the flow of fuel to the aircraft engines.

In Figure 1A an alternative rebalancing device is shown wherein a pump 57 is employed to transfer fuel from tank 4 to 6 or vice-versa, in accordance with the position of relays 50 and 52.

In the preferred circuit of this invention shown in Figure 3 fore tank proportional potentiometer 42 is physically located within the housing 60 containing the fuel quantity indicator for the fore tank and has a movable wiper which is driven by servo-motor 62 which also operates follow-up potentiometer wiper 64 which rebalances the bridge circuit 12. In a similar fashion, aft tank fuel quantity indicator housing 66 contains proportionating potentiometer 44 having a wiper arm driven by servo-motor 68 which also operates the wiper arm of rebalancing potentiometer 70 which rebalances bridge 24. The preferred embodiment of proportionating bridge circuit 40 is shown in more detail in Figure 3 consisting of proportional potentiometer 42, resistor 72, conductor 74, resistor 76, and proportional potentiometer 44 in a series circuit which is completed by ground connection 78. Resistors 72 and 76 serve to properly set the voltage ratio between the potentiometers in accordance with the weight of fuel in the respective tanks. This bridge is energized by a 115 volt 400 c.p.s. voltage source. Cabling means 80 are provided from movable wiper 82 of proportional potentiometer 42 to one end of transformer primary 84. Wiper arm 86 of potentiometer 44 is not connected to the other end of transformer primary 84 as shown in the simplified circuit, but rather it is connected to a resistive network consisting of potentiometer 88 in series with fixed resistors 90 and 92. This resistive network is connected between wiper arm 86 and the 115 volt source. Potentiometer 88 controls the amount of voltage obtained from proportional potentiometer 44 thus permitting the adjustment of the voltage ratio between the two indicators. This adjustment allows the relative fuel levels required for balance to be pre-set for the optimum performance as when due to difference in tank volume or distance from center-of-gravity a disproportional withdrawal of fuel from the tanks is necessary. The signal from transformer secondary 94 is applied to the grid 96 of voltage amplifier 98 through isolation resistor 100. The amplified output developed across plate load resistor 102, is coupled to the grids of the differential phase detector 104 through capacitor 106. Phase correction is provided by capacitor 108. Bias is developed across cathode resistor 110 which is unbypassed so as to provide inverse current feedback.

The differential phase detector 12AU7 tube serves as a differential relay amplifier. The phase of the voltage applied to the parallel grids 110 and 112 determines which of the triode sections conducts. The plates of the triodes 114 and 116 are connected in series with the coils of the controlled relays 50 and 52, and opposite ends of auto-transformer 118. Plate voltage is obtained by transformer 118 from the 115 volt 400 c.p.s. source, which is connected to a center tap on the transformer winding. By introducing the voltage in this manner, the ends of the windings, and hence the two triode plates are 180° out of phase. Cathode bias is developed across resistor 120. Capacitors 122 and 124 tune the relay coils 52 and 50 to resonance at 400 c.p.s., the power supply frequency, while RC networks 126 and 128 reduce transients caused by sparking at the relay contacts.

When the bridge voltage is balanced, and no signal voltage is applied to the grids of tube 104, neither triode section conducts sufficiently to energize the relay in its plate circuit. When an unbalance occurs in the bridge circuit, the amplified output appears at the grids of the phase detector. The triode, whose plate voltage is of the same phase as the grid voltage, conducts sufficiently to cause the relay in its plate circuit to become energized. The other triode, having grid and plate voltages which are out of phase is cut off. Thus, the phase of the unbalanced bridge output determines which of the two relays becomes energized.

The plate power for amplifier 98 is supplied by a half-wave rectifier circuit connected directly to the 115 volt source. The plate 130 and the grid 132 of the other half of tube 98 are tied together to form a half-wave rectifier. The pi section filter comprises capacitors 134 and 136 together with resistor 138. The filaments 140 and 142 of vacuum tubes 98 and 104 of the balancing control amplifier are connected in series; filament voltage is obtained from the 28 volt aircraft supply through dropping resistor 144.

Suitable circuit parameters include:

| | |
|---|---|
| Resistor 90 | 27,000 ohms. |
| Resistor 92 | 71,000 ohms. |
| Resistor 100 | 10,000 ohms. |
| Resistor 102 | 100,000 ohms. |
| Resistor 110 | 1,500 ohms. |
| Resistor 120 | 1,200 ohms. |
| Resistor 138 | 50,000 ohms. |
| Resistor 144 | 22 ohms. |
| Resistor 150 | 470,000 ohms. |
| Network 126 | $r=500$ ohms, $C=0.05$ μf. |
| Network 128 | $r=500$ ohms, $C=0.05$ μf. |
| Capacitor 108 | 20 μμf. |
| Capacitor 122 | 0.15 μμf. |
| Capacitor 124 | 0.15 μμf. |
| Capacitor 134 | 2 μμf. |
| Capacitor 136 | 0.25 μμf. |
| Vacuum tube 98 | 12AX7. |
| Vacuum tube 104 | 12AU7. |

As the fuel level drops there is a shift in the centroid of the fuel mass. As a compensation means potentiometers 42 and 44 are designed to follow an output curve which will correct for this condition.

This system adds little to the weight of an aircraft as it utilizes in part sensing equipment normally part of a well equipped aircraft.

It is to be understood that the form of my invention, herewith shown and described, is to be taken as a preferred example of the same, and that various changes in the components, and arrangement of parts may be resorted to, without departing from the spirit of my invention or the scope of the sub-joined claims.

Having thus described my invention, I claim:

1. A control system for automatically maintaining a given ratio between the respective quantities of two bodies of liquid confined in separate containers, comprising in combination: a first capacitor adapted to vary in capacitance in accordance with the level of a first one of said bodies of liquid; a first rebalancing type bridge circuit including a source of energy, adapted to produce a first unbalance signal current in response to changes in the capacitance of said first capacitor; a first motor; controlled means under control of said first motor for rebalancing said first bridge so as to minimize said first unbalance signal current; a circuit including a source of energy and a first potentiometer under control of said first motor adapted to produce an output voltage in a first output circuit proportional to the quantity of said first body of liquid; a second capacitor adapted to vary in capacitance in accordance with the level of the other of said bodies of liquid; a second rebalancing type bridge circuit including a source of energy, adapted to produce a second unbalance signal current in response to changes in the capacitance of said second capacitor; a second motor; controlled means under control of said second motor for rebalancing said second bridge so as to minimize said second unbalance signal current; a circuit including a source of energy and a second potentiometer under control of said second motor adapted to produce an output voltage in a second output circuit proportional to the quantity of said other body of liquid; a third bridge circuit including the said output circuits of said first and said second potentiometer circuits, connected so that the said respective output voltages are in phase opposition, and a phase sensitive error signal detection means connected to said first and second output circuits so as to detect an error signal indicative of the deviation of the ratio of the quantity of one of said bodies of liquid to the other of said bodies of liquid, from the said given ratio; and means under control of said phase sensitive error signal detection means to selectively control the flow of liquid from each of said containers so as to readjust the quantity of each of said bodies in a direction tending to restore the ratio of the respective quantities of said bodies to each other to said given ratio.

2. A control system for automatically maintaining a given ratio between the respective quantities of two bodies of liquid confined in separate containers, comprising in combination: a first capacitor adapted to vary in capacitance in accordance with the level of a first one of said bodies of liquid; a first rebalancing type bridge circuit including a source of energy, adapted to produce a first unbalance signal current in response to changes in the capacitance of said first capacitor; a first motor; controlled means under control of said first motor for rebalancing said first bridge so as to minimize said first unbalance signal current; a circuit including a source of energy and a first potentiometer under control of said first motor adapted to produce an output voltage in a first output circuit proportional to the quantity of said first body of liquid, a second capacitor adapted to vary in capacitance in accordance with the level of the other of said bodies of liquid; a second rebalancing type bridge circuit including a source of energy, adapted to produce a second unbalance signal current in response to changes in the capacitance of said second capacitor; a second motor; controlled means under control of said second motor for rebalancing said second bridge so as to minimize said second unbalance signal current; a circuit including a source of energy and a second potentiometer under control of said second motor adapted to produce an output voltage in a second output circuit proportional to the quantity of said other body of liquid; a third bridge circuit including the said output circuits of said first and said second potentiometer circuits, connected so that the said respective output voltages are in phase opposition, and a phase sensitive error signal detection means connected to said first and second output circuits so as to detect an error signal indicative of the deviation of the ratio of the quantity of one of said bodies of liquid to the other of said bodies of liquid, from the said given ratio; and pump means under control of said phase sensitive error signal detection to transfer liquid from one of said containers to the other so as to readjust the quantity of each of the said bodies in a direction tending to restore the ratio of the respective quantities of said bodies to each other to said given ratio.

References Cited in the file of this patent
UNITED STATES PATENTS

| | | |
|---|---|---|
| 2,509,629 | De Giers et al. | May 30, 1950 |
| 2,532,883 | Bennett et al. | Dec. 5, 1950 |
| 2,537,498 | Wickesser | Jan. 9, 1951 |
| 2,563,280 | Schafer et al. | Aug. 7, 1951 |
| 2,582,400 | Smith | Jan. 15, 1952 |
| 2,618,157 | Keeling | Nov. 18, 1952 |
| 2,672,880 | Hermanson | Mar. 23, 1954 |